Inventors
Dimiter Gorchev
Hend Gorchev
by Roberts, Cushman & Grover
ATT'YS

United States Patent Office 3,204,664
Patented Sept. 7, 1965

3,204,664
FLUID FLOW REGULATING VALVE
Dimiter Gorchev and Hend Gorchev, both of
5 Washington Ave., Cambridge, Mass.
Filed Mar. 16, 1962, Ser. No. 180,136
3 Claims. (Cl. 138—46)

This is a continuation-in-part of my application Serial No. 102,747, filed April 13, 1961, now abandoned, which is a continuation-in-part of application Serial No. 30,330, filed May 19, 1960, now abandoned.

The field of this invention is that of regulated fluid supply systems and regulating valves, and the invention relates more particularly to valves for maintaining constant volume fluid flow in a conduit, and to a system utilizing valves of this type.

In forced air heating or air conditioning systems it is desirable that the flow of air into any particular area be controlled locally as by a thermostat. The varying demands thus placed on the system by multiple local controls may introduce substantial fluctuations of the air pressure in the supply mains. If no steps are taken to counteract these fluctuations, each local adjustment may affect the balance of the entire system, causing short term variations in the supply of air to at least some of the other areas, which variations tend to be physiologically and psychologically more disturbing in terms of draft and noise sensations than the relatively less frequent variations introduced by the local control apparatus. One attempt to rectify this difficulty has been to place a pressure-sensitive central control device on the main pressure supply which will, for example, regulate a main fan so as to maintain its output at constant pressure. Such systems however do not alleviate the above mentioned disturbances since the varying local demand causes local pressure fluctuations due to the varying volume of air being drawn through substantial lengths of duct work between the outlets and the control point. Thus the added expense of central control is largely wasted for this purpose.

Objects of the present invention are to provide a valve which can maintain the local volume of flow constant, independently of the pressure existing in the supply mains; to provide such a valve which can be adjusted over a relatively wide range so that it can be used also to provide local control, which can be conveniently and accurately so adjusted, and which can be inexpensively manufactured and installed; to provide a flow regulating valve which can be utilized in a forced air system without introducing excessive resistance to air flow under normal conditions; to provide such a value which is not subject to rapid wear or fatigue; and to provide such a valve which will not be easily fouled or clogged with extraneous matter such as might be carried by fluid flowing through the value.

Further important aspects of the invention are to provide an air supply system in which the delivery of air to any particular area can be locally controlled independently of the conditions existing in any other area; to provide such a system wherein local air supply at any particular area is not disturbed by regulation at another area; and to provide such a system which does not require central regulation and operates at least just as well without central regulation.

The substance of the invention can be briefly summarized in some of its aspects as follows.

In a principal aspect, a valve according to the invention comprises a substantially tubular member adapted to be connected within a conduct, a plunger member supported coaxially within the tubular member thereby defining a fluid passage between the two said members, the manner of support permitting movement of the plunger parallel to the flow and at least one of the members being tapered so that movement of the plunger member in the direction of flow will reduce the size of said fluid passage, and spring means for urging the plunger member against the drag of a fluid flow.

In a practically important aspect the valve according to the invention includes viscous damping means, such as a fluid filled bellows, for checking oscillatory movement of the plunger member.

In another practically important and more specific aspect of the invention, the valve plunger member has an axial bore receiving a shaft having an adjustable collar, spring means being mounted on the shaft between the collar and a hub of the plunger for urging the plunger away from the collar against restraining means at the end of the shaft whereby, by adjusting the position of the collar, the plunger can be adapted for movement as above described in response to selected pressure differentials. In a preferred embodiment, the shaft is slidably mounted in bearings which are fixed relative to the tubular member, which has a constricted bore portion, and for purposes of adjustment the shaft and conduit are provided with suitable means such as a rack and pinion which can be easily adjusted so as to fixate the plunger and tubular members relatively to each other from without the conduit. In this manner, movement of the plunger on the shaft can be adapted to occur within a selected part of the bore portion of the tubular member.

These and other objects, aspects, advantages and results of the invention will appear from the following detailed description of several practical embodiments thereof illustrating its novel characteristics.

The description refers to drawings in which

Figure 1:
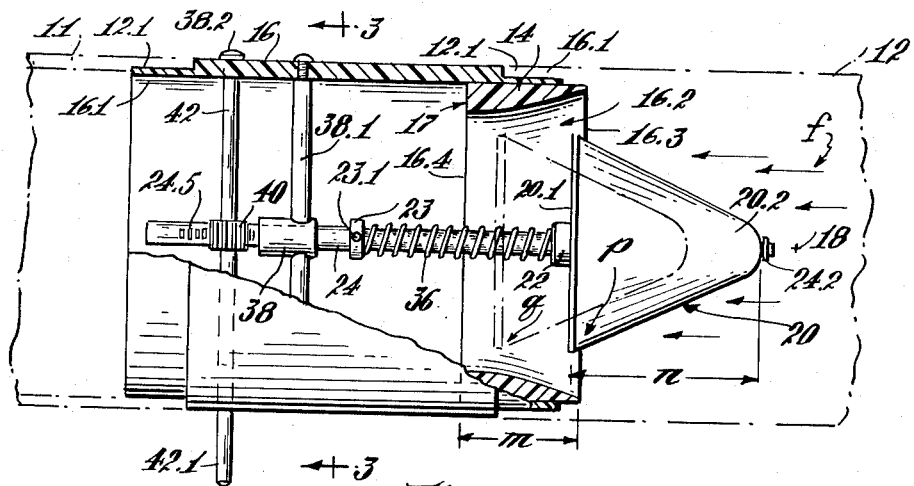
FIG. 1 is a side elevation view, partially in section, of a valve according to the invention.

Referring to the drawing, FIG. 1 illustrates one embodiment of the flow regulating valve according to this invention wherein the valve is mounted within a conduit indicated by the broken lines 11 and 12, in which fluid flow occurs between an area of relatively high fluid pressure and an area of relatively low fluid pressure in the direction indicated by the arrows $f$. As will be readily understood, the fluid flow velocity through the valve is determined by the fluid pressure differential thereacross. As illustrated, the valve is particularly well adapted for regulating air flow through the conduit 11, 12 but it should be understood that the valve is also well suited for regulating the flow of other gases and liquids if proper means are provided for forming a seal between the valve and the conduit.

The valve includes a tubular member 16 having portions of reduced diameter, as at 16.1, which are adapted to form lapped joints with correspondingly grooved portions 12.1 of the conduit 12, and can be conveniently secured within the conduit 12 by means of force fitting with the matching conduit grooves, as shown, or by any other suitable means such as soldering, cementing or bolting at 14. The tubular member has a bore portion 16.2 of a selected length $m$ which converges from a fluid inlet opening or end 16.3 of a cross-sectional area and configuration corresponding to that of the conduit to an outlet end 16.4 of smaller cross-sectional area. The converging bore portion can be embodied in an individual sleeve 17 forcefitted within the tubular member as shown or can be provided as an integral part of the tubular member, the taper of the bore portion being adapted to constrict fluid flow through the conduit without creating turbulence in the conduit adjacent the fluid inlet opening 16.3, as at the region indicated by asterisk 18.

Figure 4:
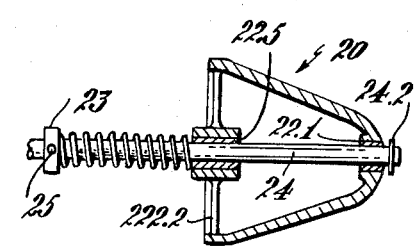
FIG. 4 is a partial section view, to enlarged scale, along the longitudinal axis of the valve plunger illustrated in FIG. 2.

The valve further includes a plunger 20 having a base portion 20.1 and a nose portion 20.2 which diverges in the direction of flow towards the base for a distance $n$. As shown particularly in FIG. 4, the plunger 20 has a hub 22 near its base. This hub has a base bushing 22.1 and is held by several, such as three, legs 22.2. The tip of the plunger 20 has a perforation with a tip bushing 22.5.

At the end of shaft 24 is a nose collar means such as a retaining ring 24.2 which keeps the bushing 22.5 on the shaft. A hub collar means 23 is adjustably secured to the shaft 24, for example by means of a set screw 23.1 and a coil spring 36 is disposed on the shaft between the collar 23 and the hub bushing 22.1 for biasing the plunger to oppose movement in the direction of fluid flow. The adjustable collar 23 can be positioned on the shaft which is mounted relatively to the tubular member as will be described below, so that the spring 36 holds the plunger in the position shown in full lines in FIG. 1, for example, against a selected differential in the fluid pressures exerted on the base and nose portions of the plunger, thereby to permit a selected volume of fluid to move through the restricted passage indicated at $p$. If fluid pressure in the conduit increases, the force exerted on the plunger nose portion will also increase thereby moving the plunger against the bias of the spring 36 to the position shown, by way of example, in dotted lines in FIG. 1. This plunger movement reduces the passage to the size indicated at $q$ and it will be readily understood that the taper of the bore portion 16.2 can be proportioned with respect to the characteristics of the spring 36 as set by collar 23 such that reduction of the passage size from that indicated at $p$ to that indicated at $q$ compensates for the increased pressure differential across the restricted passage, whereby the fluid volume moving through the passage will be constant for that spring setting and a given position of shaft 24. Since the resistance of the system downstream of the valve is by nature constant, the constant volume flow passed by the valve tends to make the discharge pressure at the valve's outlet constant also.

The nose portion 20.2 of the plunger extends oppositely of the direction of fluid flow as shown and is tapered or faired to conduct fluid flow within the fluid passage partially defined by the plunger base without creating turbulence within the conduit as at point 18. Further, as the nose portion is of a length exceeding that of the converging bore portion 16.2 of the tubular member, the nose portion will extend within an area of the conduit which is free of turbulence even when the plunger base is located at the outlet end 16.4 of the bore portion.

For permitting adjustment of the volume which is at any given time kept constant by the valve, the shaft 24 is slidably mounted in a sleeve bearing 38 which is supported in coaxial relation to the tubular member 16 by spider supports 38.1 the ends of which are riveted or otherwise fastened to the tubular member, as at 38.2. The shaft is provided with a rack section as at 24.5 and a pinion 40 is mounted upon a shaft 42 extending across the tubular member for cooperation with the shaft rack. The shaft 42 is rotatably supported in suitable bearings of the tubular member and has a control extension 42.1 which can be actuated continuously or at times from outside the valve, manually or by motor means (not shown) for rotating the pinion to move the shaft 24 in the bearing 38. Thus the bias of the spring 36 can be set, and the limits of travel of the plunger 20 can be adjusted externally. By means of this adjustment, as distinct from the above described initial adjustment by means of the collar 23 for setting a constant volume for a given position of shaft 24, the size of the restricted fluid passage which corresponds to a given pressure differential can also be adjusted and accordingly the volume rate of flow which the valve tends to maintain can be adjusted to conform to any value determined by external control means as will be described by way of example with reference to FIG. 5.

It will be seen that the valve provided by this invention is of inexpensive and yet rugged construction and that the valve can be conveniently adjusted over a wide range and is accurately responsive to variations in operating condition for providing constant fluid flow volume through the conduit. It will also be seen that, since the valve is adapted to regulate fluid flow without creating turbulence in the conduit and without requiring long fluid passages which are narrowly constricted, the valve does not introduce excessive resistance to fluid flow in the conduit under normal conditions. Further, the valve adjusting means are not likely to be clogged with lint or other extraneous matter which might be carried in the fluid flowing through the valve.

Figure 2:
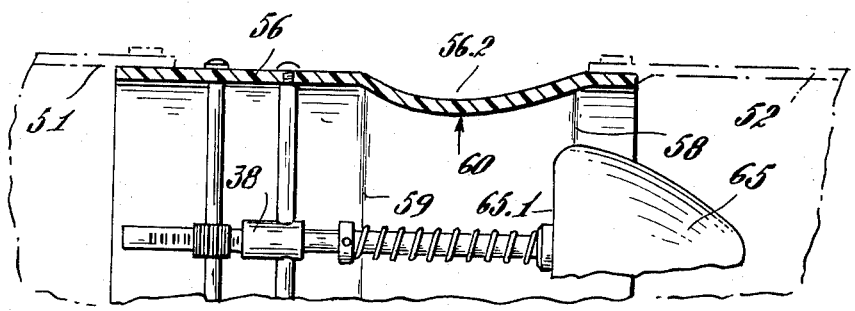
FIG. 2 is a partial section view similar to FIG. 1 showing an alternative embodiment of the valve provided by the invention.
Figure 3:
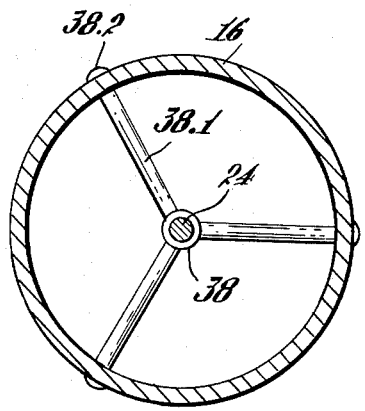
FIG. 3 is a section view along line 3—3 of FIG. 1.

An alternative embodiment of the valve according to this invention is illustrated in FIG. 2. In this embodiment of the invention, the tubular member 56 is secured within the conduits 51, 52 by means of screws 54, and the constricted bore 56.2 of the tubular member is formed by a shaped, such as molded, portion of one of the conduit members itself. The inwardly converging bore portions of this tubular member have an inlet opening 58 and an outlet opening 59 which correspond in configuration and cross-sectional area to those of the conduits 11, 12, with an intermediate portion 60 of appropriate smaller cross-sectional area. In this construction, the plunger 65 is adapted for movement through that portion of the converging bore 56.2 which extends from the inlet end 58 to the smaller portion 60 in the same manner as described above with reference to FIG. 1, that portion of the converging bore between the narrow portion 60 and the outlet end 59 serving further to reduce turbulence of fluid flow through the valve. Preferably also, the edge 65.1 of the plunger base is rounded to reduce turbulence which might be created by the valve means.

Figure 5:
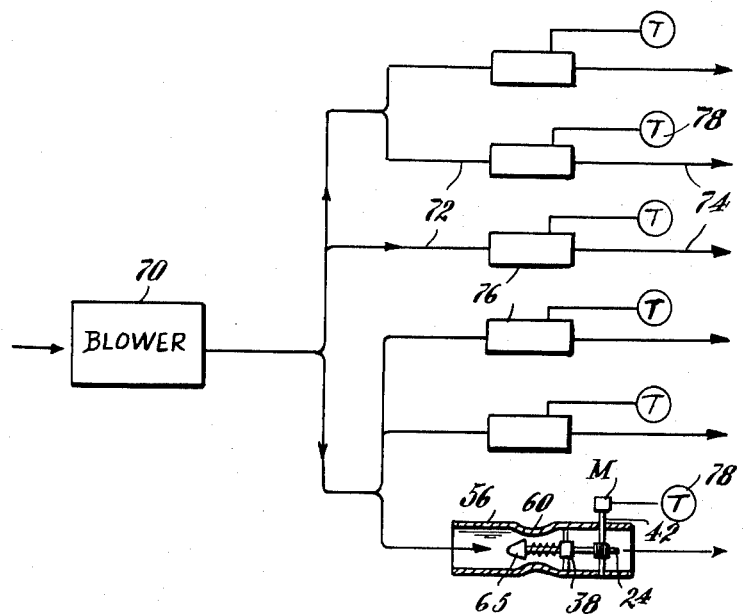
FIG. 5 is a diagrammatic illustration of an air supply system.

An improved air supply system in which the above-described valves are particularly useful will now be described with reference to FIG. 5. By way of example, this could be an air conditioning system which supplies more air, cooled to a substantially constant temperature, if the regional temperature increases such as due to turning on of lamps, increased number of occupants, or warmer outside temperature, or vice versa.

A blower 70, taking in air from any conventional cooling or heating apparatus (not shown), is arranged to feed a plurality of ducts 72. The ducts are connected to outlets 74 through valves 76 preferably of the above-described types, these valves being controlled locally by means of thermostats 78 so that the system provides a suitable amount of air to each area. One of the valves is diagrammatically shown according to FIG. 2, with a tubular member 56 having a constricted portion 60, with a plunger 65, a rod 24, a spring 36, and a shaft 42. A regulating motor M sits on shaft 42 and is controlled by one of the thermostats 78. As explained previously, even if the blower 70 were regulated so as to provide a constant output pressure, the varying demands placed upon the system through the ducts 72 would produce local fluctuations in pressure since the ducts possess an appreciable resistance to flow, with detrimental results if valves were used which do not maintain constant volume for each local demand setting. If, however, the valves are of a type which pass a constant volume of fluid over a range of supply pressures such as valves described above with reference to FIGS. 1 to 4, these local fluctuations of pressure will not affect local delivery rates. Furthermore, this favorable mode of operation will exist even if the blower 70 is not regulated but rather is permitted to deliver air according to its natural characteristic.

Figure 6:
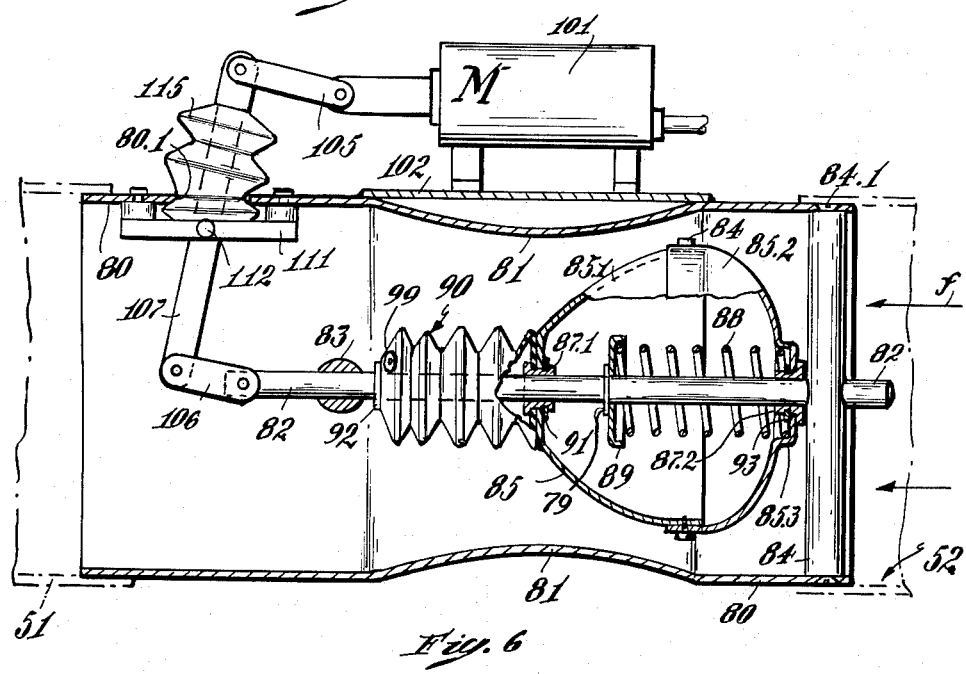
FIG. 6 is a side elevation view, in section, of another valve.

Another alternative and particularly effective construction of valves according to the invention is shown in FIG. 6. In this and analogous embodiments the tubular member or duct 80 is preferably constructed of metal, such as aluminum, tubing and the constricted portion 81 of its bore is formed by spinning. A shaft 82 is coaxially and slidably supported within the tubular member by apertured cross bars 83, 84 suitably fastened to the duct 80, such as by screws 84.1. Slidably mounted on the shaft is a hollow, rounded plunger member 85 preferably also constructed of spun aluminum in two parts 85.1 and 85.2 which are secured together by sheet metal screws 84. Suitable bushings 87.1, 87.2 of appropriate for example synthetic bearing material are provided for guidance on the shaft 82 and these bushings are held to the plunger member by C-shaped clips 91, 93.

Within the plunger member 84 is a coil spring 88, one end of which rests against a stop 89 which is prevented from moving relative to the shaft 82 by a C-shaped clip 79 and the other end of which rests on a dished portion 85.3 of the plunger part 85.2, urging the plunger member 85 in an upstream direction. Behind the plunger member 85, with reference to the direction of flow, is a bellows 90 constructed of elastic material such as neoprene and filled with a viscous fluid such as air. One end of the bellows is attached to the plunger member 85.1, by means of the above mentioned bushing 87 and the C-shaped clip 91. The other end of the bellows is secured to the shaft 82 by C-shaped clips 9 (only one of which is shown) which fit corresponding grooves in the shaft 82, on either side of the bellows wall where it adjoins the shaft. At one end of the bellows 90 is provided a metal vent 99 which permits air to pass into or out of the bellows at a substantially predetermined amount and pressure.

The position of the shaft 82 can be adjusted in the direction of flow by suitable motor means, such as a pneumatic motor 101 mounted on a platform 102 secured to the duct 80 and operating through the links 105 and 106 and the lever 107 in conventional manner. The lever 107 is hinged to the duct 80, apertured at 80.1, by means of a divided bridge 111 and a pivot pin 112. It will be evident that the bellows 90 as herein described, provides the viscosity function of a fluid which resists change in its shape or in arrangement of its elements during flow; this component therefore constitutes and is referred to herein also as a viscous dampening means. The aperture 80.1 is sealed around the lever 107 by a flexible bellows 115 which can conveniently be of the same shape and material as bellows 90, although it has a different function.

The basic operation of the valve according to FIG. 6 is similar to the embodiments shown in FIGS. 1 to 4. Flow of air through the valve in direction $f$ exerts a drag on the plunger member pushing it back against the force of the spring 88. This movement causes a contraction of the fluid passage between the plunger member and the constricted portion 81 of the tubular member 80. By a proper shaping of the taper of the constricted position 81 with respect to the characteristics of the spring 88 as set by clip 79, the valve will operate so as to pass a substantially constant volume of air for an appreciable variety of differential pressures existing across the valve. The bellows 90, not included in the above embodiments, provides viscous dampening of the movement of the plunger member so that, in certain applications which would otherwise lead to instable operation, the valve will not oscillate. The amount of damping depends, of course, on the size and configuration of the vent 99. In some situations the desired venting may be obtained merely through the clearance between the rear plunger bushing 87.1 and the shaft 82, and such a construction should be understood to be within the scope of the invention.

It will now be evident that constant volume valves according to the invention and centrally unregulated fluid control systems incorporating such valves offer the following advantages and appreciably improved results among others similarly appearing from the above exposition of the substance and nature of the invention and from the description of several embodiments thereof.

The valves according to the invention permit easy and accurate continuous adjustment within a wide range as determined by a regulating device such as a thermostat, and they automatically maintain essentially constant volume and discharge pressure for any such adjustment. Furthermore, they accomplish this with simple means, without causing turbulence and substantial resistance losses.

Fluid control systems incorporating such valves provide optimal regulation without physiological and psychologically detrimental effects, in addition to the advantages individually inherent in each valve, and in addition to the economic advantages of such optimal operation without central control. It should be noted that systems with conventional regional regulation, without as well as with central regulation exhibit the herein outlined defects whereas systems according to the present invention not only obviate central regulation with its initial cost and often cumbersome maintenance and unreliability but, in spite of the omission of central regulation, provide superior operational characteristics. As will now be evident, this is due to the fact that systems according to the invention provide optimal regional volume and discharge pressure regulation without affecting the other regions, as contrasted with central regulation systems wherein regulation at any region is likely to have detrimental effects on any other region.

While the system described above by way of example contemplates fairly simple regulation by way of thermostatically controlled supply of cold air, it will be understood that the invention is applicable to more complex systems such as using in addition temperature control of the supplied air, or individually controlled supplemental heat sources as for example regional radiators.

Although particular embodiments of the valve provided by this invention have been described for the purpose of illustration, it should be understood that the invention includes all modifications and equivalents thereof which fall within the scope of the appended claims.

We claim:

1. A valve for regulating a fluid flow comprising:
   a substantially tubular member adapted to be connected within a conduit;
   a shaft mounted coaxially within said member;
   a plunger member slidably mounted on said shaft thereby defining a fluid passage between the two said members, at least one of said tubular and plunger members, respectively, having a taper such that movement of the plunger member in the direction of flow will reduce the size of said fluid passage;
   a coil spring coaxial with said shaft one end of which is connected to the shaft and the other end of which urges said plunger member in the direction opposing the drag of a fluid flow, said taper being predetermined with respect to the characteristics of said spring so as to maintain flow through the valve at a constant volume over a substantial range of pressure differentials;
   a bellows coaxial with said shaft one end of the bellows being connected to the shaft and the other end of the bellows being connected to said plunger member; and
   a vent of predetermined configuration connecting the interior and exterior of said bellows;

whereby the movement of said plunger member in response to pressure differentials is viscously damped.

2. A valve for regulating a fluid flow comprising:

a substantially tubular member adapted to be connected within a conduit;

a shaft mounted coaxially within said member;

a hollow, rounded plunger member slidably mounted on said shaft thereby defining a fluid passage between said members, at least one of said tubular and plunger members, respectively, having a taper such that movement of the plunger member in the direction of flow will reduce the size of said fluid passage;

a coil spring coaxial with said shaft and contained within said plunger member, one end of the spring being connected to the shaft and the other end of the spring bearing on said plunger member thereby urging said plunger member in the direction opposing the drag of a fluid flow, said taper being predetermined with respect to the characteristics of said spring so as to maintain flow through the valve at a constant volume over a substantial range of pressure differentials;

a bellows coaxial with said shaft one end of which is connected to the shaft and the other end of which is connected to said plunger member; and a vent of predetermined configuration connecting the interior and exterior of said bellows, whereby movement of said plunger member in response to varying pressure differentials is viscously damped.

3. A valve according to claim 2 including means for adjusting the position of said shaft in the direction of flow.

References Cited by the Examiner

UNITED STATES PATENTS

| 1,635,040 | 7/27 | Fales | 138—46 |
| 2,925,826 | 2/60 | Streeter | 137—517 |
| 2,929,402 | 3/60 | Streeter | 137—517 |
| 2,941,401 | 6/60 | Streeter | 137—517 |
| 2,956,583 | 10/60 | Streeter | 137—517 |

FOREIGN PATENTS

| 670,839 | 4/52 | Great Britain. |
| 326,792 | 6/35 | Italy. |

LEWIS J. LENNY, *Primary Examiner.*

EDWARD V. BENHAM, *Examiner.*